United States Patent
Alexander et al.

(10) Patent No.: US 8,407,453 B2
(45) Date of Patent: *Mar. 26, 2013

(54) FACILITATING PROCESSING IN A COMPUTING ENVIRONMENT USING AN EXTENDED DRAIN INSTRUCTION

(75) Inventors: Khary J. Alexander, Poughkeepsie, NY (US); Fadi Y. Busaba, Poughkeepsie, NY (US); Mark S. Farrell, Pleasant Valley, NY (US); Bruce C. Giamei, Poughkeepsie, NY (US); Timothy J. Slegel, Staatsburg, NY (US); Charles F. Webb, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/273,320

(22) Filed: Oct. 14, 2011

(65) Prior Publication Data

US 2012/0036338 A1 Feb. 9, 2012

Related U.S. Application Data

(63) Continuation of application No. 12/023,155, filed on Jan. 31, 2008, now Pat. No. 8,078,843.

(51) Int. Cl.
*G06F 9/30* (2006.01)
(52) U.S. Cl. ........................................ 712/216
(58) Field of Classification Search .................. None
See application file for complete search history.

(56) References Cited

U.S. PATENT DOCUMENTS

| | | | |
|---|---|---|---|
| 5,193,167 A | 3/1993 | Sites et al. | |
| 5,280,593 A | 1/1994 | Bullions, II et al. | |
| 5,341,482 A | 8/1994 | Cutler et al. | |
| 5,579,498 A | 11/1996 | Ooi | |
| 5,710,912 A | 1/1998 | Schlansker et al. | |
| 6,006,325 A | 12/1999 | Burger et al. | |
| 6,009,261 A | 12/1999 | Scalzi et al. | |
| 6,009,515 A | 12/1999 | Steele, Jr. | |
| 6,119,219 A | 9/2000 | Webb et al. | |
| 6,292,939 B1 | 9/2001 | Itou et al. | |
| 6,295,601 B1 | 9/2001 | Steele, Jr. | |
| 6,633,972 B2 | 10/2003 | Konrad | |
| 6,708,269 B1 | 3/2004 | Tiruvallur et al. | |
| 7,100,027 B1 | 8/2006 | Padwekar | |
| 7,624,255 B1 | 11/2009 | Rouet et al. | |
| 8,078,843 B2 * | 12/2011 | Alexander et al. | 712/216 |
| 2002/0013918 A1 | 1/2002 | Swoboda et al. | |
| 2002/0087849 A1 | 7/2002 | Arimilli et al. | |
| 2003/0160793 A1 | 8/2003 | Emberling et al. | |
| 2006/0224864 A1 | 10/2006 | DeMent et al. | |
| 2007/0074005 A1 | 3/2007 | Abernathy et al. | |
| 2008/0040591 A1 | 2/2008 | Moyer et al. | |
| 2008/0046692 A1 | 2/2008 | Michalak et al. | |
| 2009/0198980 A1 | 8/2009 | Alexander et al. | |

FOREIGN PATENT DOCUMENTS

WO WO8807239 9/1988

OTHER PUBLICATIONS

Smith, James E., et al., "Implementing Precise Interrupts in Pipelined Processors," IEEE Transactions on Computer, vol. 37, No. 5, May 1988, pp. 562-573.

(Continued)

*Primary Examiner* — Keith Vicary
(74) *Attorney, Agent, or Firm* — John E. Campbell; Blanche E. Schiller, Esq.; Heslin Rothenberg Farley & Mesiti P.C.

(57) ABSTRACT

Processing within a computing environment is facilitated using an extended DRAIN instruction. An extended DRAIN instruction is used to stall processing within a computing environment. The instruction includes an indication of the one or more processing stages at which processing is to be stalled. It also includes a control that allows processing to be stalled for additional cycles, as desired.

18 Claims, 9 Drawing Sheets

OTHER PUBLICATIONS

"z/Architecture—Principles of Operation," IBM Publication No. SA22-7832-05, Apr. 2007.
Beck et al., "The Cyndra 5 Minisupercomputer: Architecture and Implementation," The Journal of Supercomputing 7, May 1993, pp. 143-180.

Office Action for U.S. Appl. No. 12/023,155 dated Jan. 24, 2011.
Office Action for U.S. Appl. No. 12/023,155 dated May 13, 2010.
Final Office Action for U.S. Appl. No. 12/023,155 dated Oct. 9, 2010.

* cited by examiner

PIPELINED PROCESSOR INSTRUCTION OVERLAP EXAMPLE

PIPELINE SPECIFIC ENHANCED DRAIN IMPLEMENTATION EXAMPLE

FACILITATING PROCESSING IN A COMPUTING ENVIRONMENT USING AN EXTENDED DRAIN INSTRUCTION

This application is a continuation of co-pending U.S. Ser. No. 12/023,155, entitled "Facilitating Processing in a Computing Environment Using an Extended Drain Instruction," filed Jan. 31, 2008, which is hereby incorporated herein by reference in its entirety.

BACKGROUND OF THE INVENTION

This invention relates, in general, to processing within a computing environment, and in particular, to facilitating processing using an extended DRAIN instruction.

Computer architectures frequently use specific protocols in performing and managing various processor and system level tasks. The protocols may require that an architecturally elder condition or set of conditions be met before an architecturally younger processing step may proceed. In one example, to ensure proper alignment in time between the elder condition and younger step, a DRAIN instruction is placed in the beginning of an instruction stream, i.e., before any instruction potentially required to adhere to such protocols. This ensures architecturally correct operation.

The architectural tasks requiring such protocols depend on the architectural level. There are general architectures available to programmers that describe tasks, such as instruction level exception reporting or system wide alterations, among many others that are to adhere to such protocols. There are also machine dependent internal microarchitectures restricted to proprietary internal code describing conditions required to implement complex higher level architectural tasks. The DRAIN instruction can be made available to either level architecture, as a particular processor development team deems necessary.

To maximize performance, pipelined processors are employed that do not wait to establish an architectural state associated with completely processing one instruction before processing is begun on a subsequent instruction. Processing of several instructions overlap in time. The work required to process an instruction in its entirety is divided into several common and basic steps. Each step corresponds to a pipeline stage. As an instruction proceeds through the processor, it advances to the next pipeline stage. Each stage may contain one or more instructions. Each pipeline stage overlaps with other pipeline stages. As a result, there can be many instructions at any particular point in time at various stages of execution. The pipelining of instructions has eliminated the point in time defined as an architectural state between instructions. Thus, the DRAIN instruction is used to reestablish architectural separation in time, if necessary, between an elder condition or an event of interest and a subsequent processing step.

As processor frequency has increased, the number of pipeline stages has increased. The pipeline stage a particular DRAIN instruction is to protect depends on the chosen condition(s) to monitor. The further the required stage to protect is from the stalled stage (at the beginning of the instruction stream) the more performance is degraded. With more pipeline stages, there are more stages to consider protecting and they are farther apart, in number of processor cycles, than previously. Another effect of increased processor frequency is an increase in the number of cycles required to communicate status between some, but not all, functional entities. Furthermore, the exact definition of status transmission delay may not be known early in the hardware design phase.

BRIEF SUMMARY

Although a previously defined DRAIN instruction has been implemented, there is a desire to improve performance and reduce risks to functional correctness by introducing enhancements to the DRAIN instruction that make its usage more granular and application specific.

The shortcomings of the prior art are overcome and additional advantages are provided through the provision of a computer program product for stalling processing in a processor. The computer program product includes, for instance, a computer readable storage medium readable by a processing circuit and storing instructions for execution by the processing circuit for performing a method including, for instance, obtaining an extended DRAIN instruction to stall processing within the processor, the extended DRAIN instruction including an opcode field identifying the extended DRAIN instruction, a stall field separate from the opcode field that specifies a processing stage in which to stall processing, and a field that specifies a delay; and executing the extended DRAIN instruction, the executing stalling processing at the processing stage specified by the stall field of the extended DRAIN instruction, and wherein the executing comprises stalling processing as specified by the delay indicated in the field of the extended DRAIN instruction, wherein the stalling begins after one or more specified conditions have been satisfied that would have allowed processing to continue absent the delay.

System and methods corresponding to the above-summarized computer program products are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, an enhanced drain instruction is provided that enables its use to be more granular and to have minimal impact with respect to each individual use. For example, the stalled pipeline stage for each usage of the DRAIN instruction is moved to later in the pipeline, closer to the actual functional requirement. Further, the DRAIN implementation has the ability to add more cycles to stall for any individual usage, as required or desired.

Moreover, since there is a built in failsafe (e.g., software code that can be modified), the initial hardware design can aggressively define each drain condition with a minimal number of cycles to stall, instead of overspecifying stalls to ensure absolute functional correctness.

Figure 1:
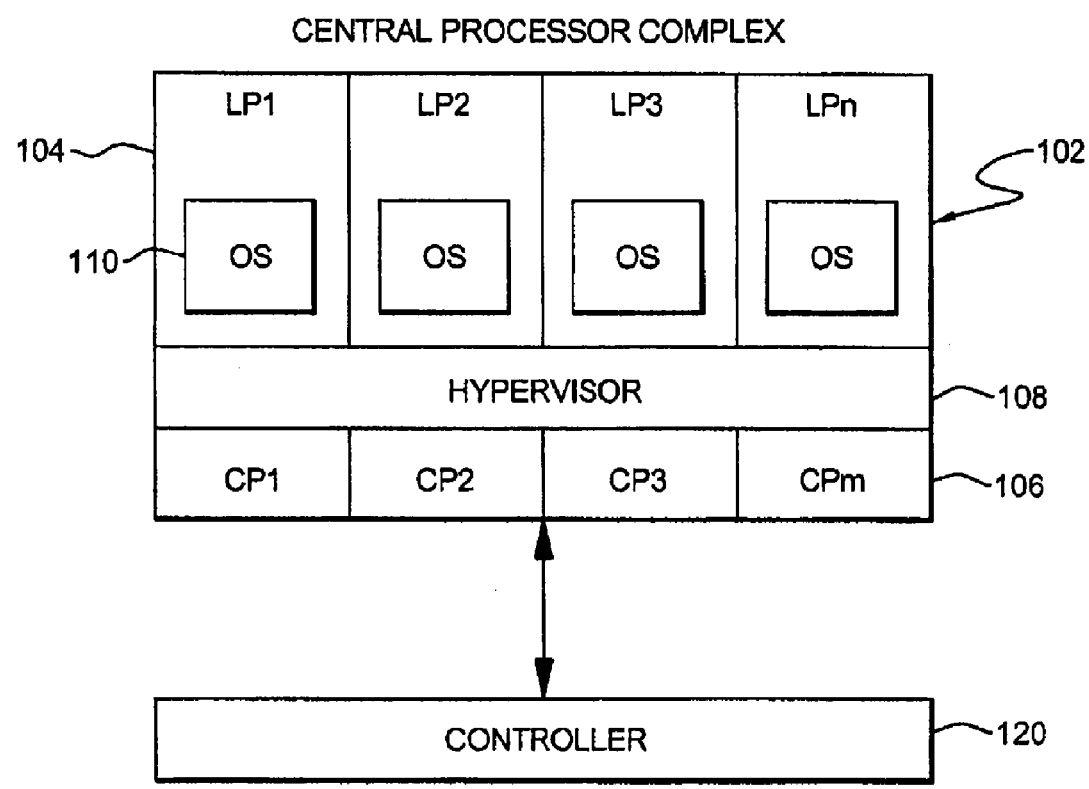
FIG. 1 depicts one embodiment of a computing environment to incorporate and use one or more aspects of the present invention.

One embodiment of a computing environment 100 to incorporate and use one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture Principles of Operation," IBM Publication No. SA22-7832-05, April 2007, which is hereby incorporated herein by reference in its entirety. In one example, a computing environment based on the z/Architecture® includes an eServer zSeries® server, offered by International Business Machines Corporation, Armonk, N.Y. IBM®, z/Architecture®, and zSeries® are registered trademarks of International Business Machines Corporation, Armonk, N.Y., U.S.A. Other names used herein may be registered trademarks, trademarks or product names of International Business Machines Corporation or other companies.

As one example, computing environment 100 includes a central processor complex (CPC) 102 coupled to a controller 120. Central processor complex 102 includes, for instance, one or more partitions or zones 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and Licensed Internal Code (also referred to as microcode or millicode) keeps a program in a logical partition from interfering with a program in a different logical partition. This allows several different logical partitions to operate on a single or multiple physical processors in a time sliced manner. In this particular example, each logical partition has a resident operating system 110, which may differ for one or more logical partitions. In one embodiment, operating system 110 is the z/OS® operating system, offered by International Business Machines Corporation, Armonk, N.Y. z/OS® is a registered trademark of International Business Machines Corporation.

Further, in this example, each logical partition executes one or more programs or routines (e.g., system level and/or application level) that executes one or more instructions. These programs, routines and/or instructions are stored, for instance, in memory local to their respective logical partitions (and/or in caches, buffers, etc.).

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors; it broadcasts messages; and otherwise, handles requests. One example of a controller is described in U.S. Pat. No. 6,119,219, entitled "System Serialization With Early Release Of Individual Processor," Webb et al., Sep. 12, 2000, which is hereby incorporated herein by reference in its entirety. Further details are also described with reference to FIG. 2.

Figure 2:
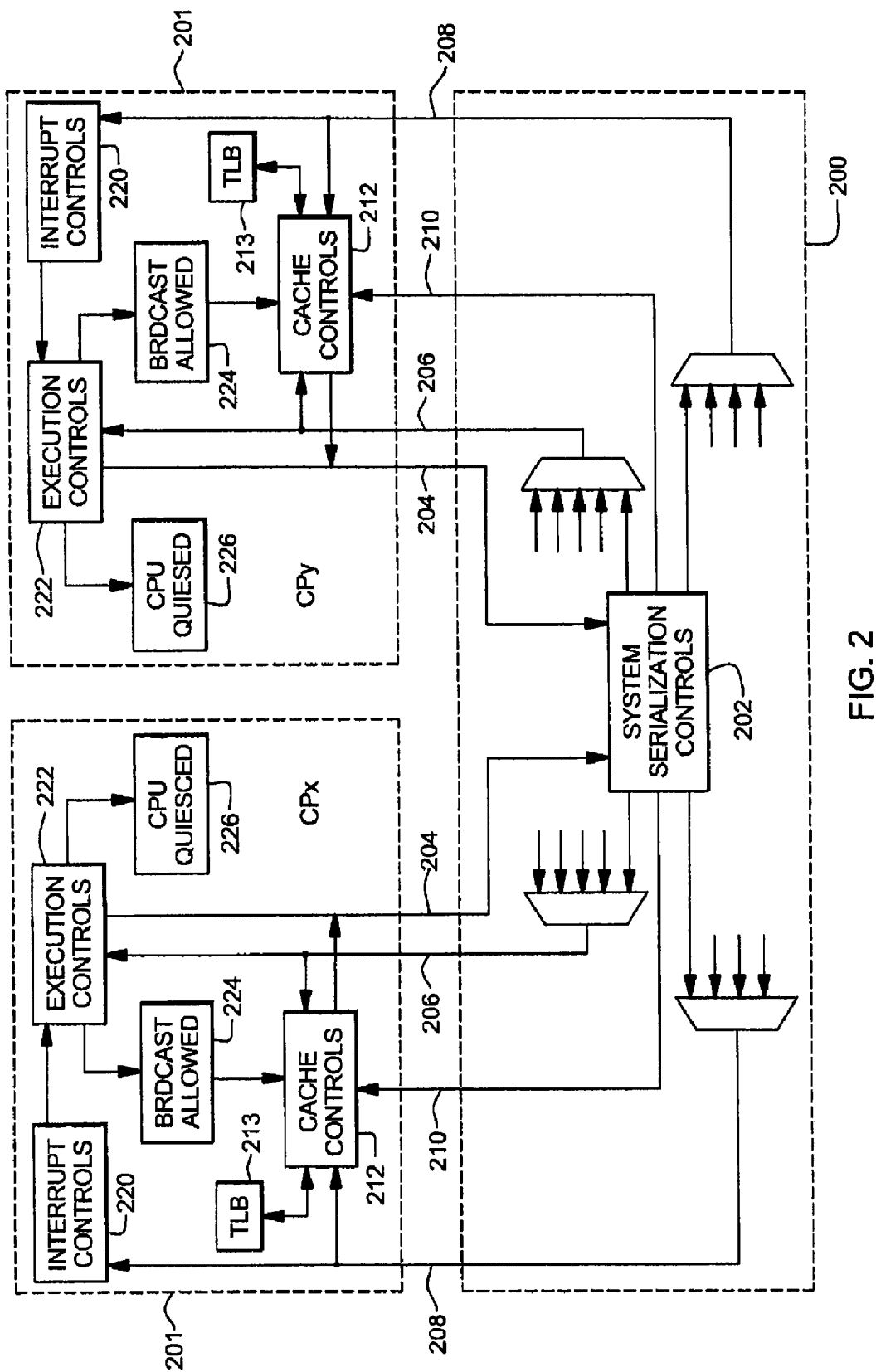
FIG. 2 depicts one embodiment of further details associated with a controller of FIG. 1, in accordance with an aspect of the present invention.

FIG. 2 depicts one example of a controller 200 coupled to a plurality of central processors (CPUs) 201. In this example, two central processors are depicted. However, it will be understood that more than two processors may be coupled to controller 200.

Controller 200 includes various controls including, for instance, system serialization controls 202. The system serialization controls are used to ensure that operations that are to be serialized, such as update operations, are serialized, in that only one such operation (or a limited number) is in progress at one time in the computing environment. It also monitors the sequence of events for that operation.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213.

In addition to cache controls 212, central processor 201 includes various other controls, including for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, execution controls 222 invokes a Licensed Internal Code routine to set a broadcast operation allowed latch 224 to enable cache controls 212 to process pending commands.

Central processor 201 also includes a CPU quiesced latch 226 that indicates whether or not the central processor is quiesced.

The above-described computing environment is only one example. Many variations are possible without departing from the spirit of the present invention. For example, one or more partitions can be running in different architecture modes. Further, in other examples, the environment need not be partitioned. For example, a single processor (e.g., a pipeline microprocessor) may incorporate and use one or more aspects of the present invention. As yet a further example, the environment need not be based on the z/Architecture®, but instead, can be based on other architectures offered by Intel® Corporation, Sun Microsystems, as well as others. Moreover, an environment may include an emulator (e.g., software or other emulation mechanisms) in which a particular architecture or a subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Further details of an emulation environment are described with reference to FIG. 3. As one example, a host computer 300 is capable of emulating another architecture, computer and/or processing capabilities of another computer. For instance, host computer 300 is based on an Intel® architecture; a RISC architecture, such as PowerPC®; a SPARC architecture, offered by Sun Microsystems; or another architecture, and is capable of emulating the z/Architecture® of IBM® or another architecture of IBM® or another entity. PowerPC® is a registered trademark of International Business Machines Corporation; Intel® is a registered trademark of Intel® Corporation.

Host computer 300 includes, for instance, a memory 302 to store instructions and data; an instruction fetch unit 304 to fetch instructions from memory 302, and to optionally, provide local buffering for the fetched instructions; an instruction decode unit 306 to receive instructions from instruction fetch unit 304 and to determine the type of instructions that have been fetched; and an instruction execution unit 308 to execute the instructions. Execution may include, for instance, loading data into a register from memory 302; storing data back to memory from a register; or performing some type of arithmetic or logical operation, as determined by the decode unit.

In one example, each unit described above is implemented in software. For instance, the operations being performed by the units are implemented as one or more subroutines within emulator software. In another example, one or more of the operations are implemented in firmware, hardware, software or some combination thereof.

Figure 3:
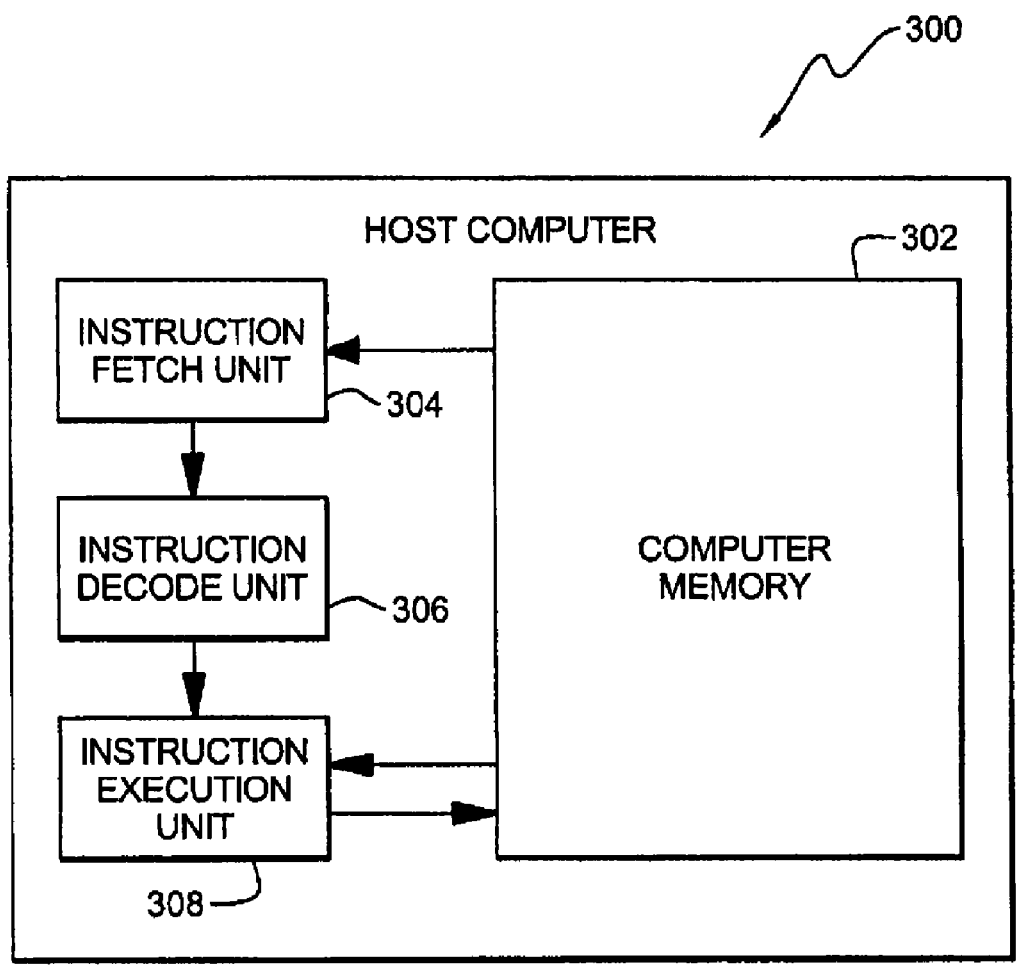
FIG. 3 depicts one embodiment of a host computer that can emulate another computer, in accordance with an aspect of the present invention.

Further, although FIG. 3 is described with reference to emulation, the environment of FIG. 3 need not be an emulation environment. In another example, instructions are executed in a native environment, and the operations are implemented in hardware, firmware, software or some combination thereof.

Any of the above described environments and/or variations thereof may incorporate and use one or more aspects of the present invention. For instance, any of the environments and/or variations thereof may introduce a DRAIN instruction, such as an enhanced DRAIN instruction of one or more aspects of the present invention, into a pipeline to stall processing within the pipeline. The benefits of the enhanced DRAIN instruction can be seen in processors of various types and frequencies. However, the implementation of higher frequency processors further shows the need for an enhanced DRAIN instruction. Thus, prior to describing the enhanced DRAIN instruction, the effect of an increase in frequency on a processor pipeline is described in order to facilitate an understanding of the DRAIN enhancements.

One example of a base processor pipeline design is described with reference to FIG. 4, and will be compared to an increased frequency design, which is described with reference to FIG. 5. Both processors (the base and high frequency processors) are designed, in this example, to implement the same ISA (Instruction Set Architecture) and both perform the same number of general operations to execute each individual instruction. While the amount of time required to completely execute an individual instruction in both designs, given the same technology, may be similar, one advantage of the high frequency design illustrated in FIG. 5 is the significantly shorter pipeline stage associated with each instruction execution (see, e.g., reference numeral 520) compared to the equivalent execution pipeline stage of a lower frequency design (e.g., reference numeral 408).

Figure 4:
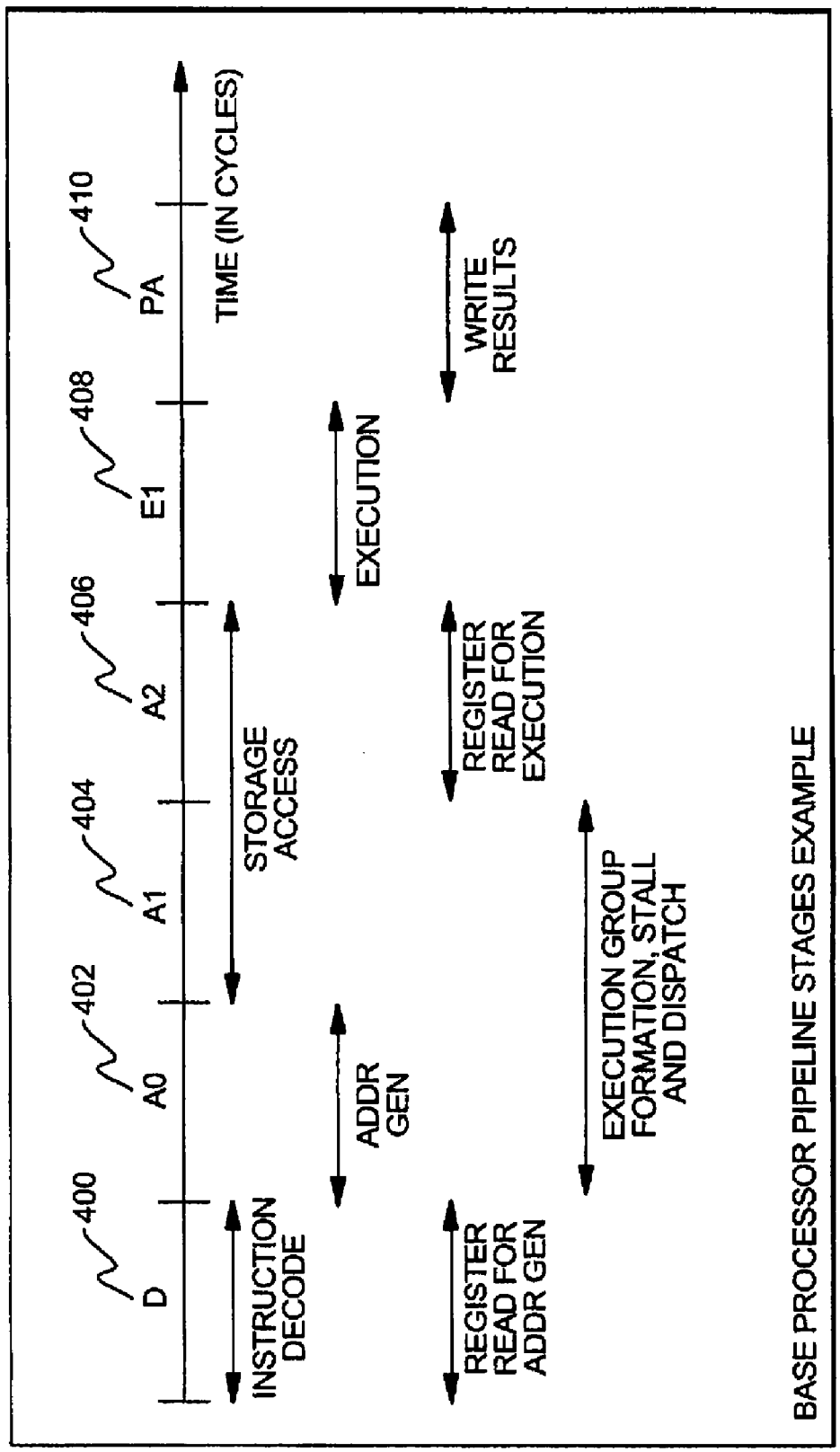
FIG. 4 depicts one example of pipeline stages for a processor, in accordance with an aspect of the present invention.

As depicted in FIG. 4, a pipeline for an instruction includes a plurality of stages, and each stage takes one or more clock cycles. For instance, cycle 400 includes an instruction decode stage during which the instruction that has been fetched is decoded. Further, during this clock cycle, registers are read for address generation. In the next cycle (402), the read register results are added along with a displacement, if any, to provide an address generation. Then, if, for example, the operation is an operand fetch, the address is sent to a data cache. The address is sent over to the data cache at the A0 cycle, which initiates a storage access (A1, A2), which takes two clock cycles, 404, 406. This is the time it takes for the address to get to the cache, read the cache and start transmitting the data to the execution unit. Further, in parallel to the above processing of A0 and A1, there is grouping of instructions that can be executed at a time. These groups are formed and sent to the execution unit.

At the time the data is coming back from the storage access, it is dispatched to the execution unit, and the execution unit is also reading registers for its own execution of the instruction (408). At 410, the result is placed back in the registers.

Figure 5:
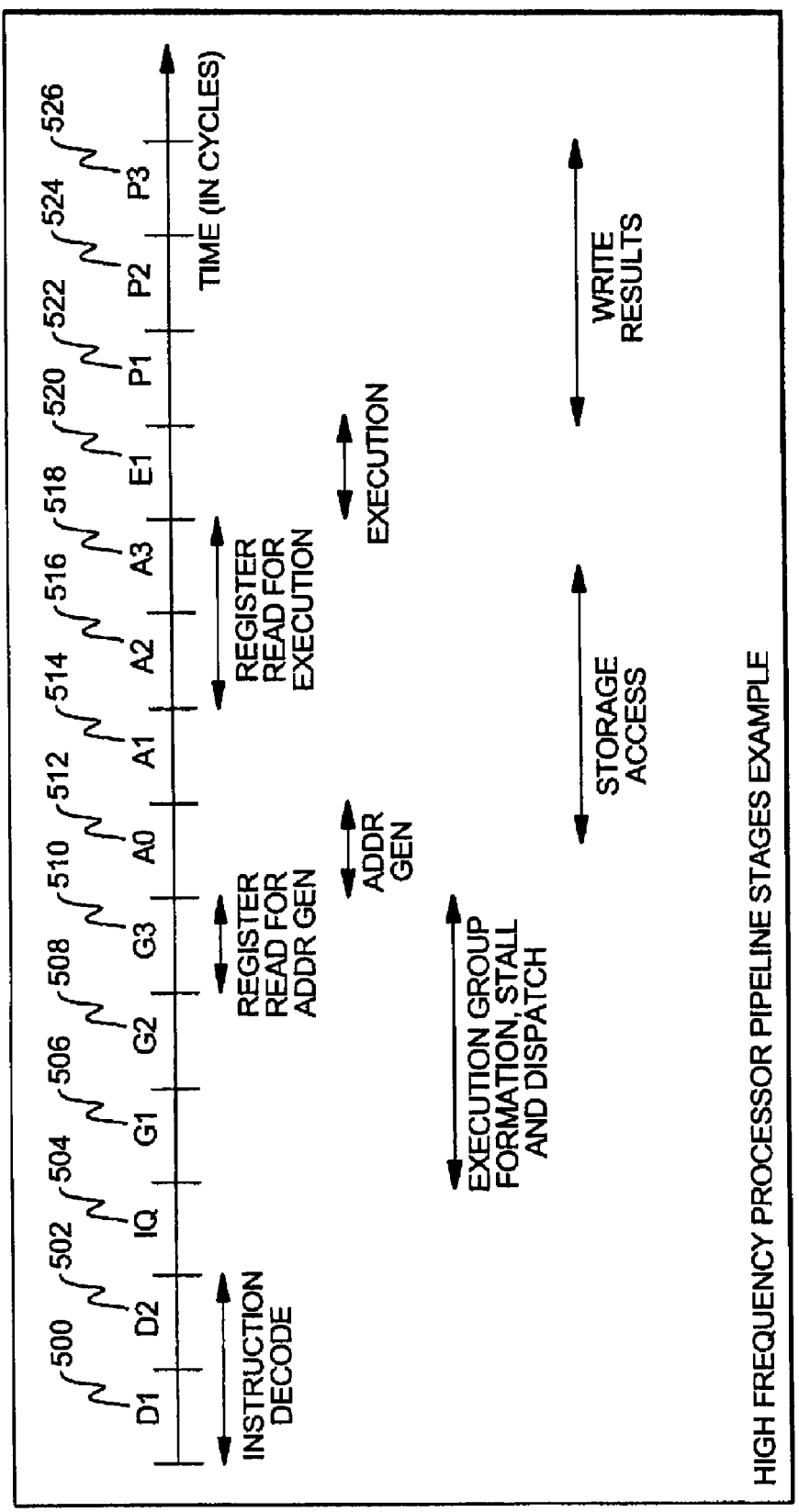
FIG. 5 depicts an example of pipeline stages for a processor running at a higher frequency than the processor of FIG. 4, in accordance with an aspect of the present invention.

FIG. 5 similarly shows a processor pipeline for an instruction. However, the processor in FIG. 5 is of a higher frequency than the processor of FIG. 4. For example, it may take two or more clock pulses to do the same amount of work. For instance, in FIG. 5, the decode stage includes cycles D1 (500)

and D2 (502), instead of just D (400) of FIG. 4. Further, in this processor, there is also an instruction queue cycle 504, which is used to queue the instruction. During cycles 506-510, an execution group is formed, and in cycle 510 one or more registers are read for address generation. In cycle 512, address generation is performed, and in cycles 512-518, storage access occurs. Further, register read for execution is performed in cycles 516-518, execution is performed in cycle 520, and the results are written in cycles 522-526.

Figure 6:
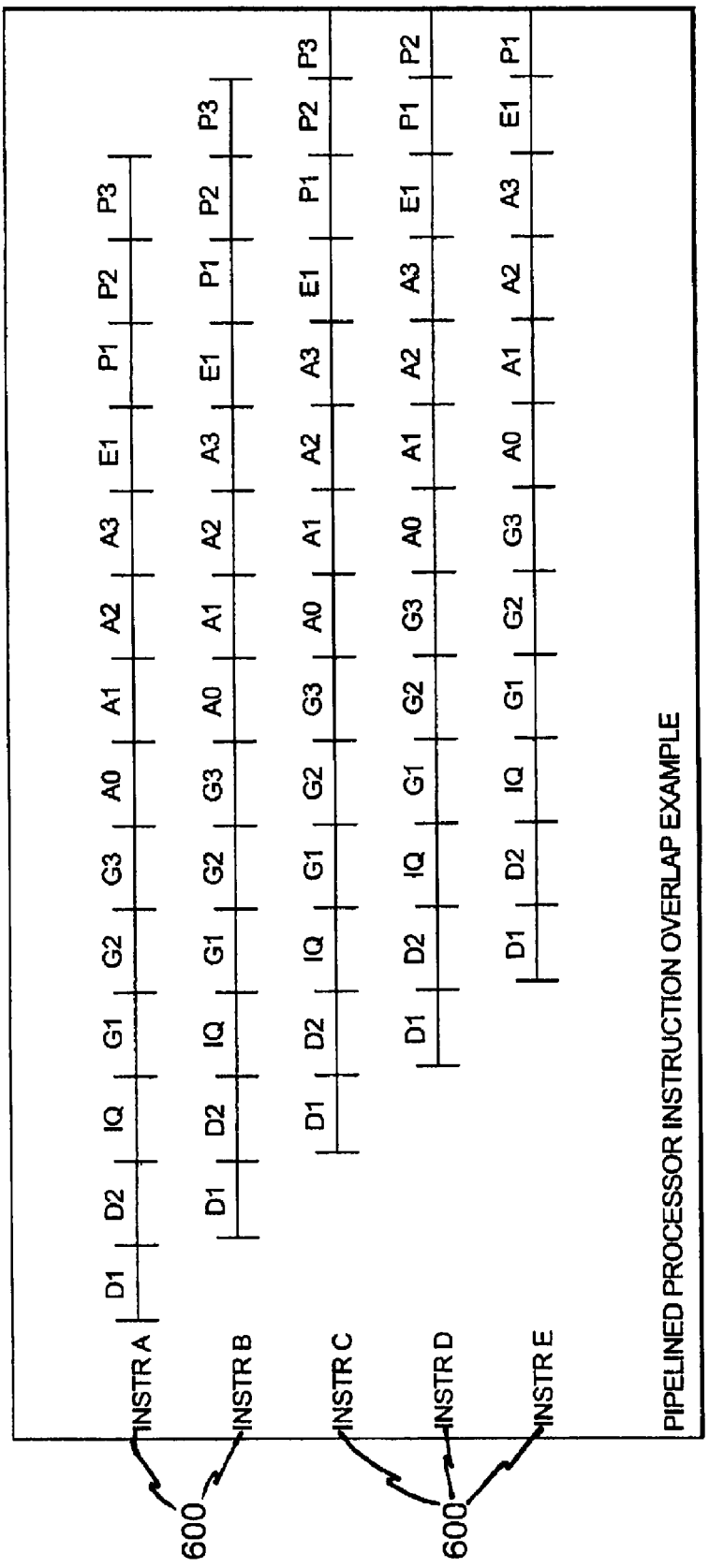
FIG. 6 depicts one example of instruction processing overlap in a pipeline processor, in accordance with an aspect of the present invention.

While FIGS. 4 and 5 depict the stages for one instruction, multiple instructions may be concurrently executed in a processor. This is illustrated in FIG. 6, which depicts one example of multiple instructions 600 being executed concurrently, each at a different stage of processing at a particular point in time.

During processor execution, processing may be stalled affecting one or more instructions, depending on their stage of processing and at which stage the processing is stalled. In accordance with an aspect of the present invention, this stalling is achieved by using an enhanced DRAIN instruction, which is usable by the various processor designs. As one example, the enhanced DRAIN instruction is included in a routine (e.g., code, program, subroutine, etc.) by a programmer. The routine may include, for instance, instructions A, B, C, and D, and the enhanced DRAIN instruction may be included between two of the instructions, such as between B and C or at any other desired place. Further, multiple extended DRAIN instructions may be placed in which the same or different stages are stalled. Other variations are also possible.

As examples, there are, for instance, three instruction processing steps that may be stalled by the extended DRAIN instruction. A first step that may be stalled is Instruction Decode (see, e.g., 400 of FIG. 4 for the base processor, and 502 of FIG. 5 for the high frequency processor). In these cases, DRAIN is intended to ensure facilities referenced during these pipeline stages for instructions younger than DRAIN reflect architecturally most recent updates. A second step that may be stalled is storage requests (see, e.g., 402 of FIG. 4 for the base processor, and 512 of FIG. 5 for the high frequency processor). In these cases, DRAIN is intended to prevent storage requests initiated by instructions younger than DRAIN until after appropriately selected storage system states have been satisfied. A third step that may be stalled is writing results, also referred to as put away (PA) or write back (see, e.g., 410 of FIG. 4 for the base processor, and 526 of FIG. 5 for the high frequency processor). In these cases, DRAIN is intended to prevent register reads initiated by instructions younger than DRAIN, associated with pipeline stage 400 or 406 (FIG. 4) in the base processor and 510 or 516 (FIG. 5) for the high frequency processor, until after results are available for instructions elder than DRAIN. Previously, DRAIN instructions were only used to stall instruction processing at the pipeline stage labeled 400 (FIG. 4) for the base processor and 502 (FIG. 5) for the high frequency processor. This provided protection for instructions younger than DRAIN, regardless of the type of protection required. However, with the extended DRAIN instruction, one or more stages can be selected depending on the type of desired protection. Although three stages are described above, more, less and/or different stages may be selected without departing from the spirit of the present invention.

Another difference between the base and high frequency processor designs which effects the performance of the DRAIN instruction is each design's Instruction Queue (IQ). More specifically, in the case of the base processor described herein, storage requests are initiated before instructions are placed into the IQ, whereas in the high frequency processor described herein, storage requests are initiated after instructions are dispatched out of the IQ to execution units. This further aggravates the potential distance between the first possible pipeline stage to stall DRAIN in the high frequency processor, labeled 502 (FIG. 5), and the pipeline stage labeled 512 required to stall DRAIN for cases required to prevent subsequent storage requests. This presents an opportunity for an even stronger justification of being able to stall DRAIN at different pipeline stages.

Figure 7:
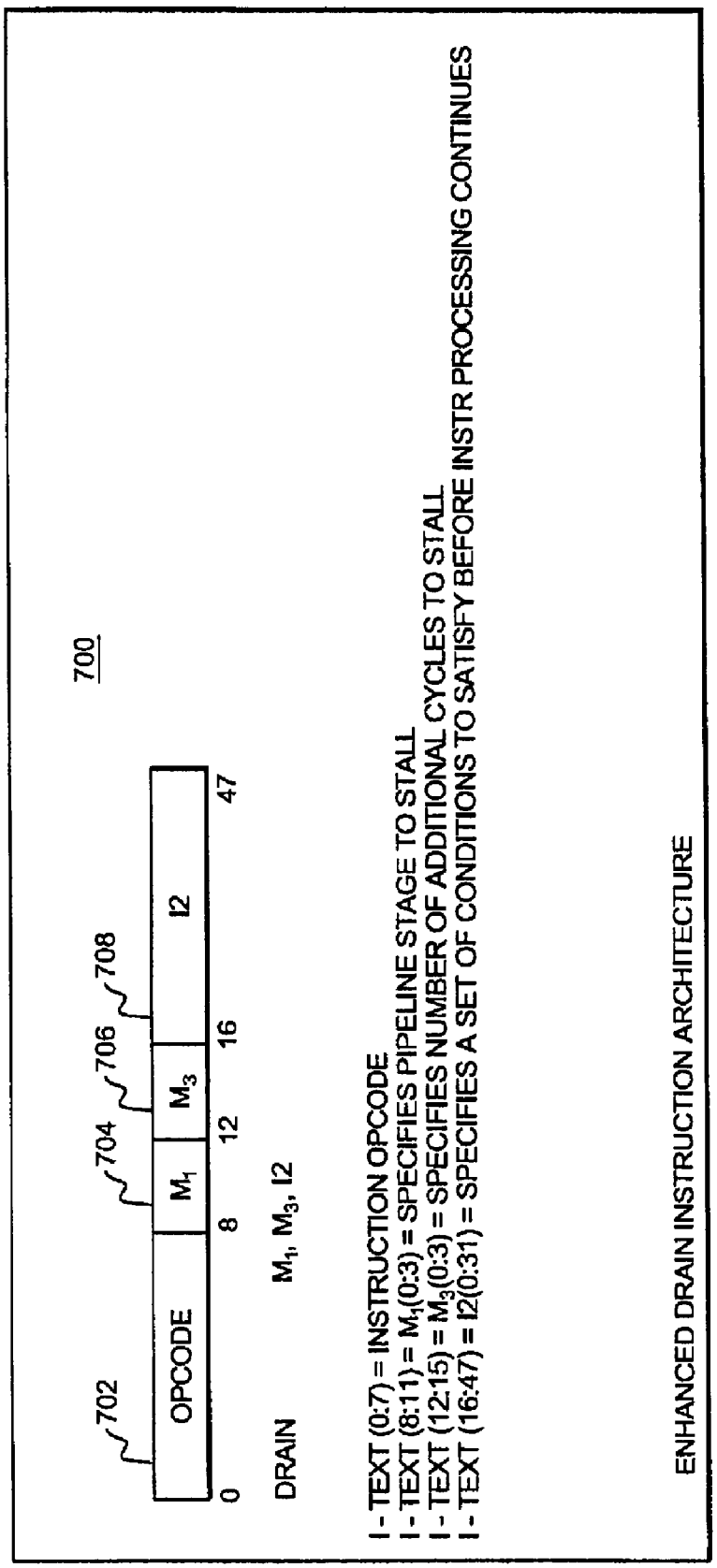
FIG. 7 depicts one example of an architecture of a DRAIN instruction, in accordance with an aspect of the present invention.

In one embodiment, the DRAIN instruction is enhanced by adding new variables to the instruction enabling more flexibility in each application of the DRAIN instruction. FIG. 7 depicts one embodiment of an architectural definition for the enhanced DRAIN instruction. As depicted, a DRAIN instruction 700 includes, for instance, an opcode 702 (e.g., bits 0-7) indicating this is the extended DRAIN instruction; a $M_1$ field 704 (e.g., bits 8-11) that specifies one or more pipeline stages to stall; a $M_3$ field 706 (e.g., bits 12-15) that specifies the number of additional cycles to stall; and an I2 field 708 (e.g., bits 16-47) that specifies a set of conditions to satisfy before instruction processing continues. The position of the fields and the size of each field can vary from that described herein.

One enhancement to the DRAIN instruction is the capacity to specify which pipeline stage the DRAIN instruction should stall in, while waiting for the selected conditions to be satisfied. Variable $M_1$ (e.g., 0:3), labeled 704, is used to specify the pipeline stage to stall DRAIN. As an example, $M_1$ (e.g., 0:3)='1'x is used to stall DRAIN in stage D2 (e.g., 502 of FIG. 5), and $M_1$ (e.g., 0:3)='0'x is used to stall DRAIN in stage G3 (e.g., 510). However, the invention is not limited to these stages. The choice of stages to stall can be design dependent and can be expanded as deemed appropriate. Further, in another embodiment, the $M_1$ (i.e., the stall field) can indicate multiple stages at which to stall. Additionally, different values can indicate different stages.

Another enhancement is the capacity to specify a variable number of additional cycles to stall DRAIN in the appropriate pipeline stage even after the selected DRAIN conditions have been satisfied. Variable $M_3$ (e.g., 0:3), labeled 706 (i.e., the cycles field), is used to specify the additional cycles. As a note of interest, for completeness, the conditions available to select, in order to satisfy the DRAIN instruction's stall, per variable I2 (e.g., 0:31), labeled 708, can be processor design specific.

An example implementation of the enhanced DRAIN instruction described above is illustrated in FIG. 8. In this example, the high frequency processor pipeline stage to stall DRAIN (and therefore, other instructions) is D2, labeled 502 (FIG. 5). Thus, $M_1$ is set to D2 and the code (e.g., hardware, or other) is strategically placed to stall at D2. In a further example, the same implementation is replicated in the high frequency processor where DRAIN is also capable of stalling stage G3, labeled 510, and in that case, $M_1$ is set to G3. Likewise, it could be replicated in other or different stages, where deemed appropriate, and $M_1$ is set to indicate that stage.

Figure 8:
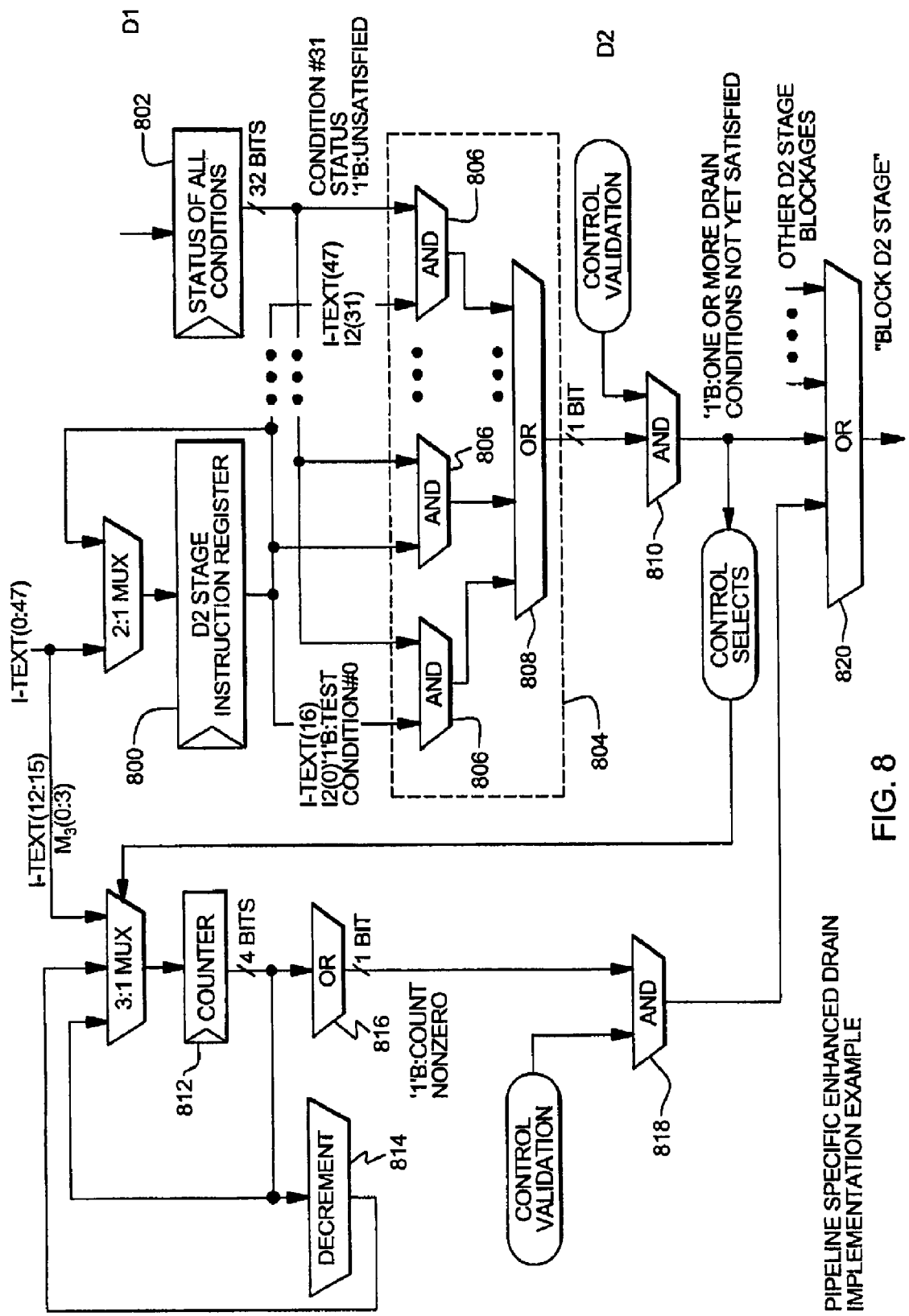
FIG. 8 depicts one example of an implementation of the DRAIN instruction of FIG. 7 within one of multiple pipeline stages, in accordance with an aspect of the present invention.

Referring to FIG. 8, in implementation, a latch 800 holds the DRAIN instruction in pipeline stage D2, if DRAIN instruction field $M_1$ (e.g., 704 of FIG. 7) specifies DRAIN should be used to stall D2, and DRAIN is held in 800 until, for instance, all conditions specified by field I2 (e.g., 708 of FIG. 7) are satisfied and the additional cycle count specified by field $M_3$ (e.g., 706 of FIG. 7) has been met. For designs with multiple decode stages operating simultaneously, instructions occupying the D2 stage elder than DRAIN are permitted (and required) to continue processing, and instructions occupying the D2 stage younger than DRAIN are also stalled in the D2 stage for at least as many cycles as the DRAIN instruction. With the implementation shown here, DRAIN is held in D2 for at least one cycle, even if the selected conditions have been satisfied and no additional count was specified, in order to meet the frequency requirement with respect to evaluating the DRAIN conditions, combining the result with other unrelated D2 stage stall conditions and holding all latches associated with the D2 pipeline stage. In other embodiments or other processors, this one cycle may not be needed.

During each cycle DRAIN is held in stage D2, the conditions specified by the I2 field in I-text are tested. If a particular I2 field bit is, for instance, '1'b, then the corresponding condition status held in latch 802 is checked. Each status bit in latch 802 has value '1'b for a condition not yet satisfied and '0'b for a condition satisfied, in this implementation. The definition of each condition and how it is set is not pertinent to the one or more aspects of the present invention. The condition testing is implemented with an AND-OR circuit 804. Within that circuit, there are up to, for instance, 32 AND gates 806. There are as many AND gates as required or desired to test, resulting in a D2 pipeline stage DRAIN stall. OR gate 808 has up to, for instance, 32 inputs. OR gate 808 has as many inputs as there are DRAIN conditions requiring a D2 pipeline DRAIN stall. AND gate 810 qualifies the condition test result with validation from more comprehensive control logic. If the output of gate 810 is, for instance, '1'b, then one or more selected DRAIN conditions have not yet been satisfied. As long as selected conditions have not yet been satisfied, a latch 812, which includes the current D2 stage DRAIN counter, maintains the count as originally specified in DRAIN instruction field $M_3$=I-text. After the selected DRAIN conditions have been satisfied, the D2 stage DRAIN counter is permitted to start decrementing by one per cycle via a decrement circuit 814. So long as the D2 stage DRAIN counter is not, for instance, '0'x, as evaluated by OR circuit 816 and qualified with control logic via an AND gate 818, the DRAIN instruction remains stalled in the D2 pipeline stage. If any selected DRAIN condition is not yet satisfied or the D2 stage DRAIN counter is nonzero or any other D2 stage stall condition unrelated to DRAIN exists, as indicated by the output of an OR circuit 820, then the DRAIN instruction will be held/stalled in the D2 pipeline stage for another cycle.

Described in detail above is an enhanced DRAIN instruction that enables an indication of one or more stages to be stalled and allows the provision of one or more additional cycles to stall. An example of a previous DRAIN instruction (i.e., without the enhancements) is described in U.S. Pat. No. 5,280,593 entitled "Computer System Permitting Switching Between Architected and Interpretation Instructions in a Pipeline by Enabling Pipeline Drain," Bullions, III et al., issued Jan. 18, 1994, which is hereby incorporated herein by reference in its entirety. Although the above-described DRAIN instruction includes the two features of indicating the stage at which to stall and the additional cycles to stall, in other embodiments, the extended DRAIN instruction may include either the indication of the stage to stall or the additional cycles.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 9:
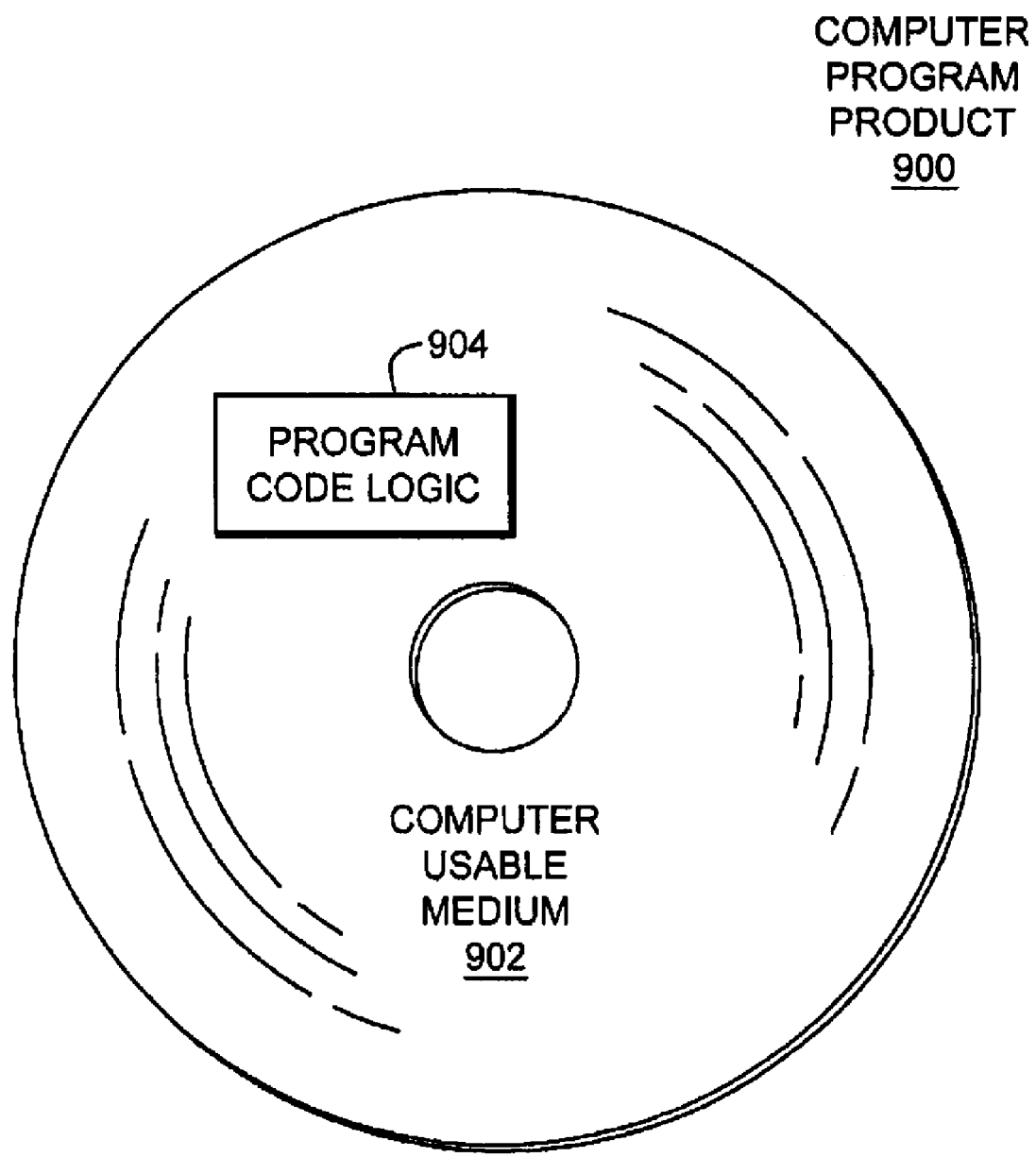
FIG. 9 depicts one embodiment of a computer program product incorporating one or more aspects of the present invention.

One example of an article of manufacture or a computer program product incorporating one or more aspects of the present invention is described with reference to FIG. 9. A computer program product 900 includes, for instance, one or more computer usable media 902 to store computer readable program code means or logic 904 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, an enhanced DRAIN instruction is provided by which internal code can control a processor's pipeline for specific sequences of code. The extensions to the DRAIN instruction provides internal code with more precise control over the resulting stalls. As used herein, the term "obtaining", such as obtaining an extended DRAIN instruction or obtaining for execution an extended DRAIN instruction, includes, but is not limited to, providing, creating, having, receiving, being provided, fetching or otherwise obtaining the instruction.

Advantageously, enhancements are provided to existing processor DRAIN instructions. One enhancement is the new capacity of specifying which pipeline stage the DRAIN instruction should stall while waiting for selected conditions to be satisfied. Another enhancement is the new capacity of specifying a variable number of cycles to stall the chosen pipeline stage even after the selected DRAIN conditions have been satisfied. These enhancements permit greater flexibility in using the DRAIN instruction. This flexibility allows for a more granular stall specification for each instantiation of the DRAIN instruction. All usages of the DRAIN instruction do not necessarily require the most restrictive coverage definition possible. The advantages of this new flexibility are overall performance improvements and reduced risk to hardware development schedule and cost. These advantages are especially relevant as pipeline processor frequencies increase.

As a result of one or more aspects of the invention, technically a solution has been achieved which improves overall performance compared to a pipelined processor that only stalls an early pipeline stage and only causes a predetermined number of cycles to stall, defined to be long enough to satisfy all cases, which is longer than required for some cases. The performance advantage is realized as a result of the new variables introduced to the DRAIN instruction, enabling more granular and minimal impacts with respect to each individual usage of DRAIN, as each usage warrants. As described above, one contributing factor is moving the stalled pipeline stage for each usage of the DRAIN instruction to later in the pipeline, closer to the actual functional requirement. Another contributing factor is the ability to design the DRAIN implementation to meet the minimal number of cycles to stall required and have the ability to add more cycles to stall for any individual usage, as required. The additional cycles count gives the flexibility to modify each application individually. Furthermore, since there is a built in failsafe, the initial hardware design can aggressively define each DRAIN condition's minimal number of cycles to stall, instead of overspecifying stalls to ensure absolute functional correctness.

Also, risks to hardware development schedule and cost potentially associated with the DRAIN instruction implementation, which may not be tested completely or observed until late in the verification schedule, are reduced. If an inadequate stall scenario is found after hardware has already been physically built, an update to software (e.g., modify specific DRAIN usage's variable specifying pipeline stage or cycle count) can fix the problem without redesigning the hardware.

In one example, the extended DRAIN instruction is used for system altering type operations for which proprietary code is to wait. In other examples, however, it is used for other operations and/or the code need not be proprietary.

Although various embodiments are described above, these are only examples. For example, many types of environments can benefit from one or more aspects of the present invention. Further, although example positions are provided for the fields, these are only examples. The fields can be in different locations within the instruction and can be of different sizes. Further, the implementation can be different than described herein. Many variations are possible without departing from the spirit of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for stalling processing in a processor, the computer program product comprising:
    a non-transitory computer readable storage medium readable by a processing circuit and storing instructions for execution by the processing circuit for performing a method comprising:
        obtaining an extended DRAIN instruction to stall processing within the processor, the extended DRAIN instruction including an opcode field identifying said extended DRAIN instruction, a stall field separate from the opcode field that specifies a processing stage in which to stall processing, and a field that specifies a duration of delay; and
        executing the extended DRAIN instruction, said executing stalling processing at the processing stage specified by the stall field of the extended DRAIN instruction, and wherein the executing comprises stalling processing specified by the duration of delay indicated in the field of the extended DRAIN instruction, wherein the stalling begins after one or more specified conditions have been satisfied that would have allowed processing to continue absent the delay.

2. The computer program product of claim 1, wherein the duration of delay comprises a number of additional cycles to stall processing.

3. The computer program product of claim 1, wherein the specified conditions are specified in a conditions field of the extended DRAIN instruction.

4. The computer program product of claim 1, wherein one execution of the extended DRAIN instruction, having a defined opcode, in a routine stalls at one processing stage and another execution of the extended DRAIN instruction, having the same defined opcode, in the routine stalls at another processing stage, the one processing stage being different than the another processing stage.

5. The computer program product of claim 4, wherein the one processing stage comprises a decode stage, and the another processing stage comprises a storage reference stage.

6. The computer program product of claim 1, wherein the field is a cycles field, and wherein the opcode field, the stall field and the cycles field are separate architected fields of the extended DRAIN instruction.

7. A computer system for stalling processing, the computer system comprising:
    a memory; and
    a processor in communications with the memory, wherein the computer system is configured to perform a method, said method comprising:
        obtaining an extended DRAIN instruction to stall processing within the processor, the extended DRAIN instruction including an opcode field identifying said extended DRAIN instruction, a stall field separate from the opcode field that specifies a processing stage in which to stall processing, and a field that specifies a duration of delay; and
        executing the extended DRAIN instruction, said executing stalling processing at the processing stage specified by the stall field of the extended DRAIN instruction, and wherein the executing comprises stalling processing specified by the duration of delay indicated in the field of the extended DRAIN instruction, wherein the stalling begins after one or more specified conditions have been satisfied that would have allowed processing to continue absent the delay.

8. The computer system of claim 7, wherein the duration of delay comprises a number of additional cycles to stall processing.

9. The computer system of claim 7, wherein the specified conditions are specified in a conditions field of the extended DRAIN instruction.

10. The computer system of claim 7, wherein one execution of the extended DRAIN instruction, having a defined opcode, in a routine stalls at one processing stage and another execution of the extended DRAIN instruction, having the same defined opcode, in the routine stalls at another processing stage, the one processing stage being different than the another processing stage.

11. The computer system of claim 10, wherein the one processing stage comprises a decode stage, and the another processing stage comprises a storage reference stage.

12. The computer system of claim 7, wherein the field is a cycles field, and wherein the opcode field, the stall field and the cycles field are separate architected fields of the extended DRAIN instruction.

13. A method of stalling processing, the method comprising:
    obtaining, by a processor, an extended DRAIN instruction to stall processing within the processor, the extended DRAIN instruction including an opcode field identifying said extended DRAIN instruction, a stall field separate from the opcode field that specifies a processing stage in which to stall processing, and a field that specifies a duration of delay; and
    executing, by the processor, the extended DRAIN instruction, said executing stalling processing at the processing stage specified by the stall field of the extended DRAIN instruction, and wherein the executing comprises stalling processing specified by the duration of delay indicated in the field of the extended DRAIN instruction, wherein the stalling begins after one or more specified conditions have been satisfied that would have allowed processing to continue absent the delay.

14. The method of claim 13, wherein the duration of delay comprises a number of additional cycles to stall processing.

15. The method of claim 13, wherein the specified conditions are specified in a conditions field of the extended DRAIN instruction.

16. The method of claim 13, wherein one execution of the extended DRAIN instruction, having a defined opcode, in a routine stalls at one processing stage and another execution of the extended DRAIN instruction, having the same defined opcode, in the routine stalls at another processing stage, the one processing stage being different than the another processing stage.

17. The method of claim 16, wherein the one processing stage comprises a decode stage, and the another processing stage comprises a storage reference stage.

18. The method of claim 13, wherein the field is a cycles field, and wherein the opcode field, the stall field and the cycles field are separate architected fields of the extended DRAIN instruction.

* * * * *